(12) United States Patent
Schneider

(10) Patent No.: US 8,667,305 B2
(45) Date of Patent: Mar. 4, 2014

(54) SECURING A PASSWORD DATABASE

(75) Inventor: James Paul Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 660 days.

(21) Appl. No.: 12/200,743

(22) Filed: Aug. 28, 2008

(65) Prior Publication Data
US 2010/0058067 A1  Mar. 4, 2010

(51) Int. Cl.
*G06F 21/00* (2013.01)

(52) U.S. Cl.
USPC .......................................... 713/193; 713/183

(58) Field of Classification Search
USPC .................. 713/193, 189, 182, 183; 380/277; 726/16–19
See application file for complete search history.

(56) References Cited

U.S. PATENT DOCUMENTS

| | | | |
|---|---|---|---|
| 7,233,997 B1 * | 6/2007 | Leveridge et al. | 709/229 |
| 7,266,699 B2 * | 9/2007 | Newman et al. | 713/182 |
| 7,437,550 B2 * | 10/2008 | Savage et al. | 713/156 |
| 7,644,285 B1 * | 1/2010 | Murray et al. | 713/183 |
| 2004/0177248 A1 * | 9/2004 | Yoshida | 713/155 |
| 2007/0006305 A1 * | 1/2007 | Florencio et al. | 726/22 |
| 2009/0327740 A1 * | 12/2009 | Schneider | 713/183 |

FOREIGN PATENT DOCUMENTS

WO   WO 2007017884 A1 * 2/2007

OTHER PUBLICATIONS

"Web Services Security UsernameToken Profile 1.1", OASIS Committee Specification, Nov. 14, 2005.*
"Escaping via Hash—CodingForums.com", Apr. 5, 2006. Retrieved Jun. 19, 2011 from http://www.codingforums.com/showthread.php?t=83704.*
Menezes et al. Handbook of Applied Cryptography. CRC Press, 1997. pp. 15-21, 250-259, 332-338, 393-394, 648-653.*

* cited by examiner

*Primary Examiner* — Zachary A Davis
(74) *Attorney, Agent, or Firm* — Lowenstein Sandler LLP

(57) ABSTRACT

An apparatus and a method for encrypting a username is described. In one embodiment, a hashed username is encrypted with an encryption function. An input size of the encryption function matches an output size of the encryption function. The password associated with the hashed username is replaced with a function of the encrypted username. The function includes a linear combination operator of the password and the encrypted username. The encrypted username is then swapped with the replaced password. The encryption, replacement, and the swapping are iterated for at least two rounds using a different key with each iteration.

15 Claims, 4 Drawing Sheets

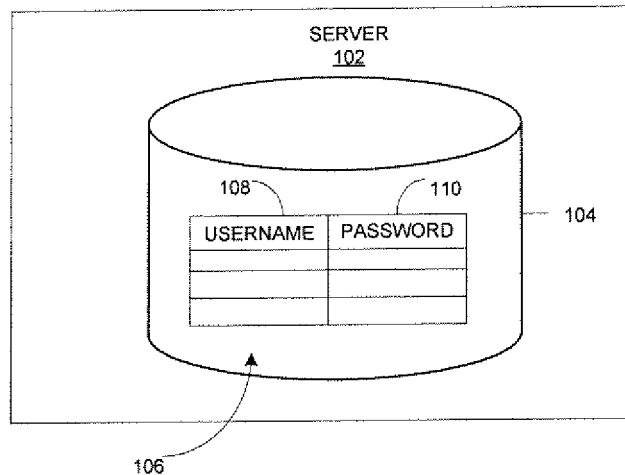
FIG. 1 – PRIOR ART
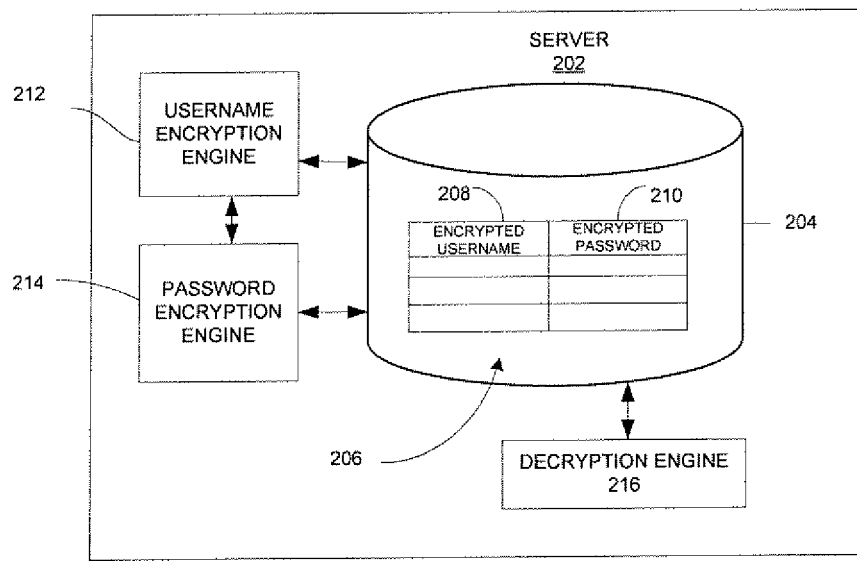
FIG. 2

SECURING A PASSWORD DATABASE

TECHNICAL FIELD

Embodiments of the present invention relate to computing systems, and more particularly, to securing a password database.

BACKGROUND

One means of authentication includes the use of a password on computer systems. For example, on UNIX-type systems, the password for an account is stored in a hashed form. To make it harder for an attacker who has access to the hashed password to perform a class of brute force attacks and potentially gain knowledge of several passwords at once, the password is augmented with a small random value, also known as "salt" before it is hashed. The salt value and the hashed password are then stored in association with other account properties. Ordinarily, only passwords are encrypted and protected while other account credentials are not.

Thus, if the password database were to be compromised, an attacker would be able to impersonate any user on the system. As such, it would be desirable to have a technique where if an attacker were to gain access to the encrypted password file, the attacker would have to perform a brute-force attack against both the username and the password.

BRIEF DESCRIPTION OF THE DRAWINGS

The present invention is illustrated by way of example, and not by way of limitation, in the figures of the accompanying drawings and in which:

FIG. 1 is a block diagram illustrating a username and password storage in accordance with a prior art.

FIG. 2 is a block diagram illustrating one embodiment of a username and password storage.

DETAILED DESCRIPTION

Figure 3:
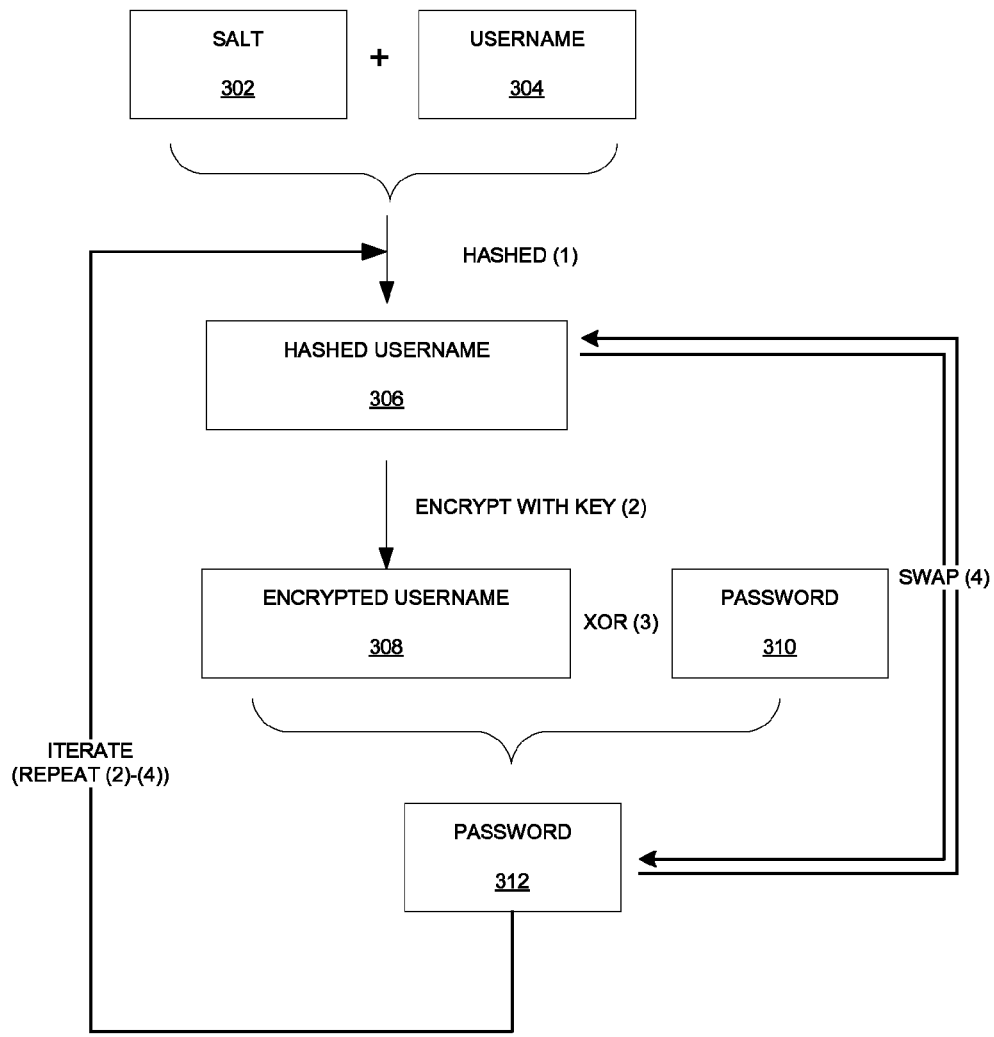
FIG. 3 is a block diagram illustrating one embodiment of encrypting a username.

Described herein is a method and apparatus for encrypting a username. In one embodiment, a hashed username is encrypted with an encryption operation. An input size of the encryption operation matches an output size of the encryption operation. The password associated with the hashed username is replaced with a function of the encrypted username. The function includes an XOR of the password and the encrypted username. The encrypted username is then swapped with the replaced password. The encryption, replacement, and the swapping are iterated for at least two rounds using a different key with each iteration.

FIG. 1 is a block diagram illustrating a conventional username and password storage. A storage 104 of a server 102 stores a table of usernames 108 and passwords 110 in plain text (e.g., non-encrypted). As such, an attacker having access to the database 104 is able to obtain the usernames 108 and corresponding passwords 110.

In another system, a password is encrypted using a username-based authentication scheme and stored with a plaintext username. However, if the password database were to be compromised, an attacker would be able to impersonate any user on the system because the proof of knowledge of the encrypted password is assumed to prove identity.

FIG. 2 illustrates a storage 204 of a server 202 in accordance with one embodiment. Instead of storing the password with the username in plaintext as described in FIG. 1, an encrypted version of the username is used. In this case, using a key-dependent hash that is iterated, for example, a few hundred times in accordance with one embodiment. Since both the username and the hashed password are needed to authenticate, the attacker would not only need to guess the username, but also attempt to validate it against the encrypted version.

In one embodiment, a username encryption engine 212 can perform encryption using, for example, a hashing algorithm with several iterations. A password encryption engine 214 may be configured to encrypt using, for example, another hashing algorithm with several iterations. The encrypted usernames 208 and corresponding passwords 210 are stored in a table 206 in storage 204.

In accordance with another embodiment, a user identifier (e.g. a user ID) associated with the username can also be encrypted and stored in the database 204.

In accordance with another embodiment, a property associated with the username and the user identifier can be encrypted and stored in the storage 204. Alternatively, the encrypted usernames 208, the encrypted passwords 210, the encrypted user identifiers are stored in a first database of the server 202. The encrypted properties are stored in a second database of the server 202.

In one embodiment, username encryption engine 212 combines the username with a salt value and computes the combined username and salt value using a hashing algorithm. In one embodiment, the salt value can be based on the encrypted password, the username, and an authentication context identifier.

In one embodiment, password encryption engine 214 combines the password with a salt value and computes the combined password and salt value using a hashing algorithm. The salt value can include a random string or can be based on the username and an authentication context identifier. When the salt value is a random string, it is stored with the encrypted password.

In another embodiment, a decryption engine 216, coupled to storage 204, decrypts each username-password pair and runs successive iterations on each pair in parallel until a username-password pair is decrypted to the hashed username. In one embodiment, the number of successive iterations is limited to a predetermined number.

In one embodiment, decryption engine 216 can also store the decrypted usernames and passwords for each iteration until the username-password pair is decrypted to the hashed username. In another embodiment, decryption engine 216 decrypts each username-password pair, and stores the decrypted usernames and passwords in memory for other future authentications.

FIG. 3 is a block diagram illustrating one embodiment of an encryption of a username. In one embodiment, a salt value 302 is combined with a username 304. The combined salt value 302 and username 304 is computed using a hashing algorithm (1) to yield the hashed username 306. The salt value can include a random string or can be based on the username and an authentication context identifier.

Increasing the security of the password can be accomplished by thoroughly mixing it with keying material and the username. The following operations are iterated for at least two rounds. The hashed username 306 is encrypted in a key-dependent fashion (2). This encryption does not need to be reversible (e.g., performing a MAC computation). Nevertheless, the input size of the encryption operation needs to match the output size of the encryption operation. If the encryption step happens in a tamper-resistant fashion (e.g., hardware crypto module, or using keys that are only available in memory after an operator enters a password at a console), the encrypted username and password will be secure. An attacker would have to break the hardware crypto module, or the presumably protected memory for the keys, in these cases. The key used in the encryption step should be different for each round or iteration.

Password 312 is then replaced (3) with a linear combination operator (e.g. XOR) of the original password value 310 and the result of the above encryption (encrypted username 308). Password 312 and hashed username 306 are swapped (4).

Getting back to the username and password can be done by swapping the hashed username 306 and the password values, and running the same sequence of operations, using the keys in reverse order.

Figure 4:
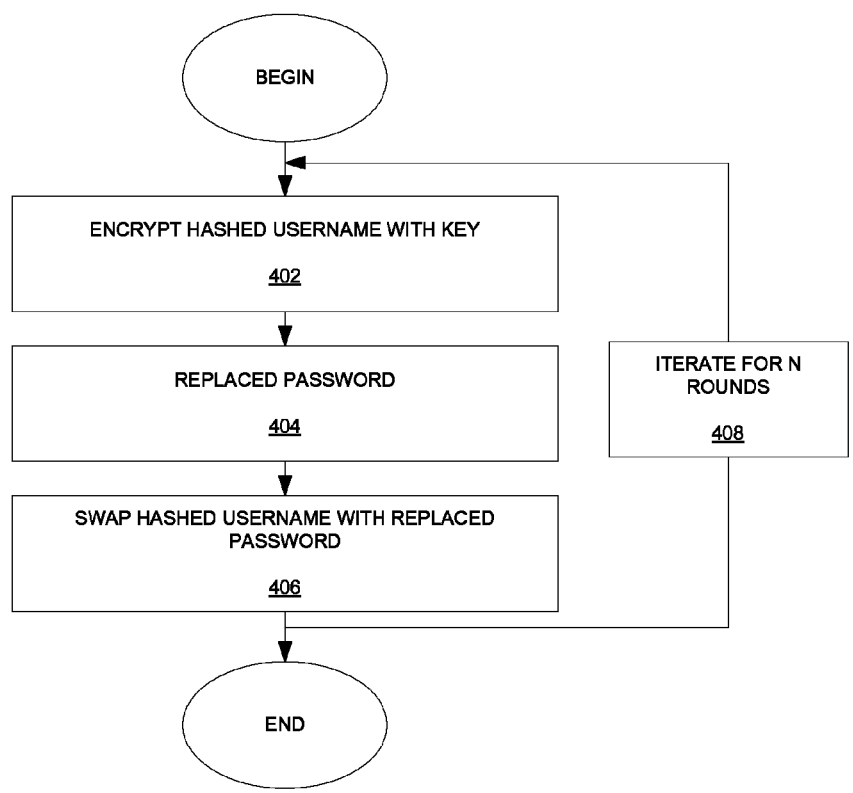
FIG. 4 is a flow diagram illustrating one embodiment of a method for encrypting a username.

FIG. 4 is a flow diagram illustrating one embodiment of a method for encrypting a password. The process encrypts a hashed version of both the username and the password in such a way that the original hashed versions of the username and password are recoverable. Hashing is not required. If the system can guarantee that the username and password will be of a particular size that can be used by an encryption or hashing algorithm—say, 16 characters for using MD5, or 20 for SHA-1—then the username and password can be used directly.

In one embodiment, the basic process can be represented as follows:

$$L[i+1]=R[i]$$

$$R[i+1]=L[i]\string^E(R[i],K[i])$$

where L[x] and R[x] are the left and right halves being processed in round x. L[1] is the hashed username and R[1] is the hashed password. E(x,K) is the encryption function that encrypts x using the key K, and '^' is a linear combination operator (e.g., the bitwise XOR function).

This process is completely reversible. If the keys are used in reverse order, and the left and right halves are swapped before starting, the process is its own inverse.

In another embodiment, at 402, a hashed username is encrypted with a key. At 404, the password is replaced with the XOR of the original password value and the result of the above encryption (encrypted username). At 406, the hashed username is swapped with the replaced password. At 408, the encryption of 402, replacement of 404, swap of 406 are iterated for a fixed or variable number of rounds.

The security of the presently described method can be improved by using a variable number of rounds. The first time a particular user attempts to log in, the authentication server would have to attempt to decrypt each username-password pair, running successive rounds on each pair in parallel until it found a pair that decrypted to the hashed username. However, because this could easily become a denial-of-service point, the possible number of rounds needs to be limited (e.g. 100 or so rounds).

If the number of rounds for each username-password pair were fixed, and the system was presumably secure against online attacks (so, the assumption is that an attacker could potentially read the password database, but not the memory of a running process), the authentication process could decrypt all of the usernames and passwords at once, and keep the decrypted versions in memory to speed up authentication. Otherwise, the time required to authenticate would increase linearly with the number of users in the password database.

Similarly, a system that uses a variable number of rounds could keep the results of all of the cryptographic functions the system has done on username-password pairs that have not yet resulted in a successful authentication to speed up other authentications later. Or, if the system has enough secure memory, the authentication process could pre-process all of the username-password pairs for the maximum number of rounds in use by the system, keeping each intermediate result.

Figure 5:
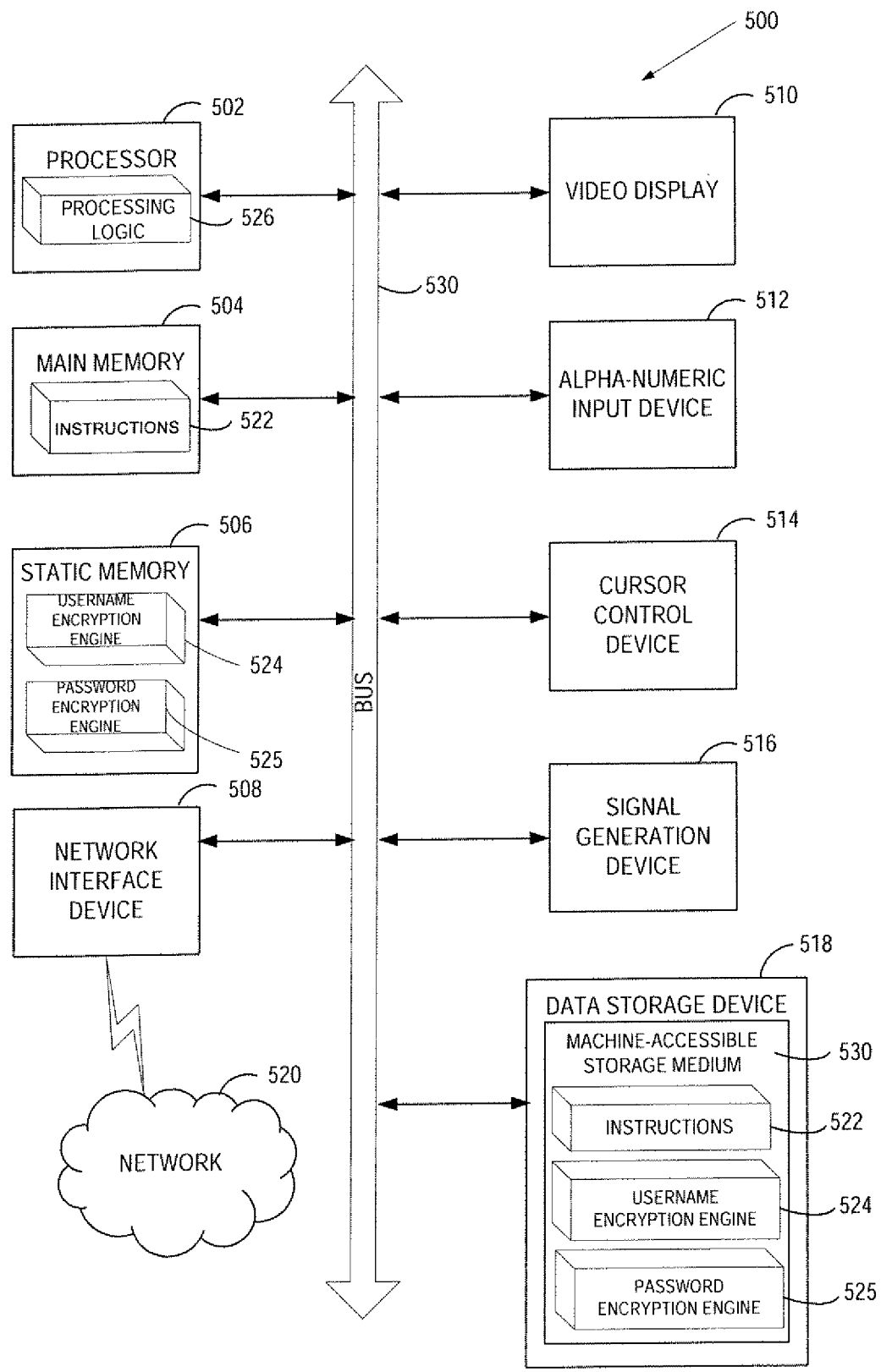
FIG. 5 is a block diagram illustrating an example of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store the username encryption engine 524 and the password encryption engine 525 as presently described. The username and password encryption engines 524, 525 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer systems registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    encrypting a first value with an encryption operation using a key to generate an encrypted value, wherein the first value initially comprises a hashed username, an input size of the encryption operation matching an output size of the encryption operation;
    determining a combined value using a function of the encrypted value and a second value, wherein the second value initially comprises a password associated with the hashed username;
    setting the second value equal to the combined value;
    swapping the first value with the second value;
    iterating the encrypting, the determining, the setting, and the swapping for at least two rounds; and
    storing the first value and the second value after swapping the first value and the second value for each round of the encrypting, determining, setting, and swapping, in memory for future authentications.

2. The computer-implemented method of claim 1 wherein the function comprises a linear combination operator of the encrypted value and the second value.

3. The computer-implemented method of claim 1 further comprising:
    using a different key with each round when encrypting the first value.

4. The computer-implemented method of claim 1 further comprising:
    encrypting the second value using the key to obtain a second encrypted value;
    determining a third value using a second function of the first value and the second encrypted value;
    setting the first value equal to the third value;
    swapping the first value and the second value after setting the first value equal to the third value; and
    iterating the encrypting, determining, setting, and swapping for a number of rounds, wherein the number of rounds is less than or equal to a predetermined number and greater than or equal to two.

5. The computer-implemented method of claim 4 further comprising:
    storing the first value and second value after swapping the first value and the second value for each round of the encrypting, determining, setting, and swapping.

6. A server comprising:
a memory to store data; and
a processing device, coupled to the memory, the processing device configured to:
encrypt a first value with an encryption operation using a key to generate an encrypted value, wherein the first value initially comprises a hashed username, an input size of the encryption operation matching an output size of the encryption operation;
determine a combined value using a function of the encrypted value and a second value, wherein the second value initially comprises a password associated with the hashed username;
set the second value equal to the combined value;
swap the first value with the second value;
iterate the encrypting, the determining, the setting, and the swapping for at least two rounds; and
store the first value and the second value after swapping the first value and the second value for each round of the encrypting, determining, setting, and swapping, in memory for future authentications.

7. The server of claim 6 wherein the function comprises a linear combination operator of the first value and the second value.

8. The server of claim 6 further wherein the processing device uses a different key with each round when encrypting the first value.

9. The server of claim 6 wherein the processing device is further configured to:
encrypt the second value using the key to obtain a second encrypted value;
determine a third value using a second function of the first value and the second encrypted value;
set the first value equal to the third value;
swap the first value and the second value after setting the first value equal to the third value; and
iterate the encrypting, determining, setting, and swapping for a number of rounds, wherein the number of rounds is less than or equal to a predetermined number and greater than or equal to two.

10. The server of claim 9 wherein the decryption engine processing device stores the first value and second value after swapping the first value and the second value for each round of the encrypting, determining, setting, and swapping.

11. A non-transitory computer-accessible storage medium including data that, when accessed by a processing device, cause the processing device to perform operations comprising:
encrypting a first value with an encryption operation using a key to generate an encrypted value, wherein the first value initially comprises a hashed username, an input size of the encryption operation matching an output size of the encryption operation;
determining a combined value using a function of the encrypted value and a second value, wherein the second value initially comprises a password associated with the hashed username;
setting the second value equal to the combined value;
swapping the first value with the second value;
iterating the encrypting, the determining, the setting, and the swapping for at least two rounds; and
storing the first value and the second value after swapping the first value and the second value for each round of the encrypting, determining, setting, and swapping, in memory for future authentications.

12. The non-transitory computer-accessible storage medium of claim 11 wherein the function comprises a linear combination operator of the encrypted value and the second value.

13. The non-transitory computer-accessible storage medium of claim 12 wherein the operations further comprise:
encrypting the second value using the key to obtain a second encrypted value;
determining a third value using a second function of the first value and the second encrypted value;
setting the first value equal to the third value;
swapping the first value and the second value after setting the first value equal to the third value; and
iterating the encrypting, determining, setting, and swapping for a number of rounds, wherein the number of rounds is less than or equal to a predetermined number and greater than or equal to two.

14. The non-transitory computer-accessible storage medium of claim 13 wherein the operations further comprise:
storing the first value and second value after swapping the first value and the second value for each round of the encrypting, determining, setting, and swapping.

15. The non-transitory computer-accessible storage medium of claim 11 wherein the operations further comprise:
using a different key with each round when encrypting the first value.

* * * * *